Patented July 5, 1932 1,866,278

UNITED STATES PATENT OFFICE

BENJAMIN F. WALLACE, OF BROOKLYN, NEW YORK

COMPOUND FOR USE IN CASTING METALS

No Drawing.   Application filed August 27, 1930.  Serial No. 478,284.

This invention relates to the manufacture of compositions employed in the production of sand molds for casting metal, which compositions are adapted to effect the clean separation at the parting line of the mold surfaces both from adjacent mold surfaces, as well as from the surfaces of the wood or metal patterns used in forming the molds without deleteriously affecting the production of pattern true castings in such molds.

In my prior Patent No. 1,717,820, dated June 17, 1929, I have generally described a parting composition in which various greases were employed to saturate a base such as calcium carbonate or precipitated calcium sulphate. My subsequent investigations have led to the discovery that while greases or oily products, such as tallow, stearic acid, or melted degras grease are adapted to produce excellent parting products, nevertheless stearin pitch, a by-product of the manufacture of soap, possesses certain peculiar characteristics which render it remarkably adaptable for the impregnation of various bases such for example as calcium carbonate, finely divided coke, infusorial earth, burnt clay and the like, in order to produce parting compositions for casting metals that have certain highly desirable properties not possessed by parting compositions made from ordinary stearic acid, tallow or melted degras grease.

As a preferred example of my parting composition and method of making same, the following is set forth:—

A suitable base in a finely divided condition, preferably about 300 mesh in fineness, such as precipitated calcium carbonate, coke, infusorial earth, burnt clay, or other inert base such as is commonly employed in parting compositions, is impregnated with a solution of stearin pitch in a volatile solvent such as kerosene, gasolene, carbon tetrachloride or the like. Preferably for each 450 parts of highly absorbent base, such as calcium carbonate, I employ about 100 parts of kerosene containing 20 to 25 parts of stearin pitch and when employing finely pulverized coke, say 300 mesh, I employ but about 80 parts of kerosene containing 20 parts of stearin pitch. The amount of stearin pitch solution employed should be just sufficient to dampen the mass of the inert base and the amount of stearin pitch while preferably approximating but about 5% by weight of the base should be sufficient to thoroughly waterproof the same so as to render the same impervious and highly repellant to moisture. In the case of calcium carbonate and other extremely light bases, such parting composition should, when distributed on the surface of water, be capable of floating thereon for a period of weeks or even months without settling.

After the impregnation of the base with the stearin pitch solution, the same is then heated until the volatile vehicle smokes, preferably at a temperature of 180 to 200° C., the same being held at this temperature until test specimens thereof will float en masse on water without isolated particles being dislodged therefrom or if shaken up with water, such test specimens will immediately return to the top when the shaking ceases.

When the heat treatment is finished and preferably the same is continued for approximately one-half hour, the product is ground to an extreme degree of fineness, preferably about 300 mesh and the product is then finished and ready to be packed in suitable containers for shipment.

Preferably the mixing operation is conducted in a suitable batch mixer provided with a mesh agitator or stirrer, such for example a shaft equipped with paddles or helical blades or any other device designed to prevent the balling up of the mass during the mixing operation. Preferably this mixer is heated either by the waste gases from a furnace or by direct heat from a fire located directly beneath the same or in any other desired manner.

While I prefer to effect the preliminary solution of the stearin pitch in a volatile solvent, I may also effect the direct mixture of the stearin pitch, as such, with the heated base, this mixing operation being preferably accomplished in a pug-mill or by atomizing the heated pitch over the heated base or in any other suitable manner that will serve to homogeneously distribute the stearin pitch over the base particles. However, when such direct admixture is effected, I may, in lieu of employing a base which is in a substantially dry condition, utilize the wet filter cakes as such that are obtained from the penetration of calcium carbonate in various operations wherein the same is produced in a precipitated form, such for example as in the production of magnesia from dolomite rock. Such filter press cake, which ordinarily will contain about 70% of water, is first introduced in a centrifuge wherein a substantial percentage of the water is removed and a product containing about 50% of calcium carbonate and 50% of water is thus obtained. This latter mass is then placed in the mill or mixer aforesaid and the stearin pitch is directly introduced thereinto, both the mixture in the mill and the stearin pitch prior to the introduction thereinto being preferably heated to about 180 to 200° C. in order to facilitate the mixture of stearin pitch with the base. The water is, of course, first vaporized from the mixture and the grease or oil vehicle is thoroughly distributed throughout the mass during such vaporization period and as soon as the water has been substantially driven off the thorough and intimate penetration of the stearin pitch throughout the mass is effected in the same manner as when a dry precipitated calcium carbonate base is employed as above described. While this "wet process" requires a longer time for the production of a batch of the finished parting than does the above described dry process, nevertheless where the precipitated calcium carbonate is available in the form of a wet cake it eliminates the necessity and the expense of drying the same before its introduction into the mixture besides making it possible to maintain a more thorough distribution of the stearin pitch throughout the batch, as not only is the heating and mixing operation of greater duration but also the wet, putty-like mass of this extremely light material tends to offer more resistance to the agitating devices, with the consequence that such vehicle becomes more thoroughly incorporated with the calcium carbonate base.

My improved product, unlike those obtained by the incorporation of stearic acid, degras grease or tallow with bases such as calcium carbonate as described in my said Patent No. 1,717,820, will contain substantially all of the waterproofing ingredients, namely the stearin pitch, which was originally admixed with the base as none of its essential ingredients are volatilized below 180° C. and partly because of this fact and because of its inherent properties, a more effective parting composition is obtainable where stearin pitch is employed rather than other waterproofing agents such as described in such prior patent. Furthermore, my improved parting composition containing stearin pitch, as such, is capable of effectively parting molds where parting compositions employing stearic acid are wholly ineffective and this result is believed to be, as above stated, due to the fact that essentially all of the stearin pitch originally introduced into the mixture is retained therein.

Various changes within the scope of the appended claims may be made without departing from the spirit of my invention as embraced therein.

Having thus described my invention, what I claim and desire to obtain by United States Letters Patent is:—

1. The method of making a parting composition for molds of foundries, which comprises impregnating a mass of an inert finely divided base with a small percentage, and not exceeding 10%, of by-product pitch derived from the manufacture of soap, heating the mixture during the continued agitation thereof to a temperature sufficient to drive off highly volatile ingredients thereof and until test portions of the mixture when thrown on water show a tendency, when submerged beneath the surface, to immediately rise again to the surface.

2. The method of making a parting composition for molds of foundries, which comprises impregnating an aqueous mass of a finely divided inert base with a solution of stearin pitch, the amount of stearin pitch introduced into the mixture not exceeding 10% by weight of the inert base, subjecting the mixture while agitating the same to sufficient heat to evaporate all of the highly volatile ingredients thereof and until test portions of the mass when thrown on water, will be submerged beneath the surface thereof, immediately rise again to the surface and then cooling the mass and pulverizing the same.

3. The method of making a parting composition for foundries, which comprises impregnating an aqueous mass of a precipitated alkaline earth metal carbonate with a small percentage, not exceeding 10% of by-product pitch derived from the manufacture of soap, and then subjecting the mass, while agitating the same, to heat sufficient to evaporate substantially all of the moisture and to effect the thorough and homogeneous penetration of the waterproof substance into the base and until test portions of the mass when thrown on water will be submerged beneath the surface thereof, immediately rise again to the surface.

4. A parting composition for molds for foundries, comprising an inert porous base constituting its major ingredient, the same being homogeneously impregnated with a very small percentage, but not exceeding 10%, of stearin pitch, said composition being capable of floating on water without settling for long periods and in excess of fourteen days.

5. A parting composition for molds for foundries, comprising a finely precipitated calcium carbonate base constituting its major ingredient, the same being homogeneously impregnated with a very small percentage, but not exceeding 10%, of by-product pitch derived from the manufacture of soap, said composition being capable of floating on water without settling for long periods and in excess of fourteen days.

Signed at New York, in the city, county and State of New York, this 26th day of August, 1930.

BENJAMIN F. WALLACE.